United States Patent
Wen et al.

(10) Patent No.: US 10,551,640 B2
(45) Date of Patent: Feb. 4, 2020

(54) WAVELENGTH DIVISION MULTIPLEXED POLARIZATION INDEPENDENT REFLECTIVE MODULATORS

(71) Applicant: Futurewei Technologies, Inc., Plano, TX (US)

(72) Inventors: Yangjing Wen, Cupertino, CA (US); Yan Cui, Sunnyvale, CA (US); Xiao Shen, San Bruno, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/357,199

(22) Filed: Nov. 21, 2016

(65) Prior Publication Data
US 2018/0143460 A1    May 24, 2018

(51) Int. Cl.
*G02F 1/01* (2006.01)
*G02B 6/27* (2006.01)
(Continued)

(52) U.S. Cl.
CPC ............ *G02F 1/011* (2013.01); *G02B 6/2746* (2013.01); *G02B 6/29386* (2013.01);
(Continued)

(58) Field of Classification Search
CPC .. G02F 1/011; G02F 2203/06; G02F 2203/58; G02B 6/2746; G02B 6/29386;
(Continued)

(56) References Cited

U.S. PATENT DOCUMENTS 5,069,520 A    12/1991    Calvani et al.
5,307,197 A    4/1994    Tanabe et al.
(Continued)

FOREIGN PATENT DOCUMENTS

CN    1369153 A    9/2002
CN    1900768 A    1/2007
(Continued)

OTHER PUBLICATIONS

Luo et al., Time- and Wavelength-Division Multiplexed Passive Optical Network (TWDM-PON) for Next-Generation PON Stage 2 (NG-PON2), in Journal of Lightwave Technology, vol. 31, No. 4, pp. 587-593, Feb. 15, 2013.*

(Continued)

*Primary Examiner* — Peter Radkowski
(74) *Attorney, Agent, or Firm* — Conley Rose, P.C.

(57) ABSTRACT

An apparatus comprising a polarization beam splitter optically coupled to a first light path and a second light path and configured to receive a CW light having a plurality of wavelengths, forward a first light beam of the CW light along the first light path, and forward a second light beam of the CW light along the second light path. A first multiplexer coupled to the first light path and configured to de-multiplex the first light beam into a first plurality of channels each corresponding to one of the plurality of wavelengths. A second multiplexer coupled to the second light path and configured to de-multiplex the second light beam into a second plurality of channels each corresponding to one of the plurality of wavelengths. A modulator coupled to the first multiplexer and the second multiplexer and configured to modulate the first plurality of channels and the second plurality of channels.

21 Claims, 3 Drawing Sheets

(51) Int. Cl.
  *G02B 6/293* (2006.01)
  *G02B 27/28* (2006.01)
  *H04J 14/02* (2006.01)
  *H04J 14/06* (2006.01)
  *G02B 6/12* (2006.01)

(52) U.S. Cl.
  CPC ....... *G02B 6/29389* (2013.01); *G02B 27/283* (2013.01); *G02B 27/286* (2013.01); *G02B 6/272* (2013.01); *G02B 6/2793* (2013.01); *G02B 6/29343* (2013.01); *G02B 2006/12142* (2013.01); *G02F 2203/06* (2013.01); *G02F 2203/58* (2013.01); *H04J 14/02* (2013.01); *H04J 14/06* (2013.01)

(58) Field of Classification Search
  CPC .............. G02B 6/29389; G02B 27/283; G02B 27/286; H04J 14/02; H04J 14/06
  See application file for complete search history.

(56) References Cited

U.S. PATENT DOCUMENTS

| | | | |
|---|---|---|---|
| 5,495,366 A | 2/1996 | Esman et al. | |
| 5,654,818 A | 8/1997 | Yao | |
| 6,400,856 B1 | 6/2002 | Chin | |
| 6,417,957 B1 | 7/2002 | Yao | |
| 6,519,060 B1 | 2/2003 | Liu | |
| 6,580,851 B1 * | 6/2003 | Vahala | G02B 6/12007 385/15 |
| 6,656,584 B1 * | 12/2003 | Sugimoto | C03C 13/046 385/142 |
| 6,751,002 B2 | 6/2004 | Ovadia et al. | |
| 7,065,272 B2 * | 6/2006 | Taillaert | B82Y 20/00 359/563 |
| 7,088,497 B1 | 8/2006 | Carlisle et al. | |
| 7,251,076 B1 | 7/2007 | Okada et al. | |
| 7,327,911 B2 | 2/2008 | Piede et al. | |
| 7,428,358 B2 | 9/2008 | Lu et al. | |
| 8,131,156 B2 * | 3/2012 | Yu | H04B 10/2587 398/168 |
| 8,923,660 B2 * | 12/2014 | Dorin | G02B 6/2766 385/1 |
| 8,988,753 B2 * | 3/2015 | Schwedt | G02B 21/0092 359/238 |
| 9,203,517 B2 * | 12/2015 | Zhou | H04B 10/614 |
| 9,235,100 B1 | 1/2016 | Kaplan | |
| 9,647,426 B1 | 5/2017 | Fish et al. | |
| 9,831,944 B2 | 11/2017 | Izumi | |
| 9,979,472 B1 | 5/2018 | Wang et al. | |
| 2001/0004290 A1 | 6/2001 | Lee et al. | |
| 2002/0041562 A1 * | 4/2002 | Redmond | G02B 27/0025 369/112.19 |
| 2002/0051600 A1 | 5/2002 | Hung | |
| 2003/0118280 A1 | 6/2003 | Miyazaki et al. | |
| 2003/0235370 A1 | 12/2003 | Taillaert et al. | |
| 2004/0005056 A1 | 1/2004 | Nishioka et al. | |
| 2004/0190107 A1 | 9/2004 | Hiironen et al. | |
| 2004/0247227 A1 * | 12/2004 | Eder | G02B 6/12007 385/11 |
| 2005/0047727 A1 | 3/2005 | Shin et al. | |
| 2005/0088724 A1 | 4/2005 | Lee et al. | |
| 2005/0163503 A1 | 7/2005 | Lee et al. | |
| 2006/0093360 A1 | 5/2006 | Kim et al. | |
| 2006/0266744 A1 * | 11/2006 | Nomaru | B23K 26/0057 219/121.75 |
| 2007/0121189 A1 | 5/2007 | Zami et al. | |
| 2007/0230882 A1 | 10/2007 | Hainberger | |
| 2008/0019693 A1 | 1/2008 | Sorin | |
| 2009/0060525 A1 * | 3/2009 | Von Lerber | H04B 10/299 398/155 |
| 2009/0214224 A1 | 8/2009 | Cho et al. | |
| 2009/0220230 A1 | 9/2009 | Kim et al. | |
| 2010/0002881 A1 | 1/2010 | Youn et al. | |
| 2010/0006784 A1 * | 1/2010 | Mack | G02B 6/34 250/551 |
| 2010/0119229 A1 | 5/2010 | Roelkens et al. | |
| 2010/0254719 A1 * | 10/2010 | Zhang | H04B 10/505 398/202 |
| 2010/0303469 A1 | 12/2010 | Barton et al. | |
| 2011/0122470 A1 | 5/2011 | Berrettini et al. | |
| 2011/0142395 A1 * | 6/2011 | Fortusini | G02B 6/34 385/37 |
| 2011/0273657 A1 | 11/2011 | Collings et al. | |
| 2012/0014697 A1 | 1/2012 | Zhao et al. | |
| 2012/0106963 A1 | 5/2012 | Huang et al. | |
| 2012/0301068 A1 * | 11/2012 | Meade | G02B 6/12007 385/2 |
| 2013/0058652 A1 | 3/2013 | Charbonnier et al. | |
| 2013/0129361 A1 | 5/2013 | Hsiao | |
| 2014/0099057 A1 * | 4/2014 | Sun | G02B 6/4204 385/33 |
| 2014/0153862 A1 | 6/2014 | Picard et al. | |
| 2014/0193152 A1 * | 7/2014 | Zhou | H04B 10/614 398/72 |
| 2014/0341579 A1 * | 11/2014 | Effenberger | H04J 14/0221 398/68 |
| 2014/0348460 A1 * | 11/2014 | Dorin | G02B 6/2766 385/3 |
| 2015/0063741 A1 | 3/2015 | Menezo et al. | |
| 2015/0063807 A1 | 3/2015 | Simonneau et al. | |
| 2015/0078702 A1 | 3/2015 | Dorin et al. | |
| 2015/0277207 A1 | 10/2015 | Fujikata | |
| 2015/0338577 A1 | 10/2015 | Shi et al. | |
| 2015/0316722 A1 * | 11/2015 | Miao | G02B 6/264 359/489.08 |
| 2016/0007105 A1 * | 1/2016 | Jeong | H04Q 11/0005 398/34 |
| 2016/0246005 A1 | 8/2016 | Liu et al. | |
| 2016/0261352 A1 | 9/2016 | Wen et al. | |
| 2016/0315699 A1 | 10/2016 | Izumi | |
| 2016/0337041 A1 * | 11/2016 | Wen | H04B 10/532 |
| 2017/0059887 A1 | 3/2017 | Park et al. | |
| 2017/0155451 A1 | 6/2017 | Hayakawa | |
| 2017/0346592 A1 | 11/2017 | Liu et al. | |
| 2018/0143460 A1 | 5/2018 | Wen et al. | |

FOREIGN PATENT DOCUMENTS

| | | | |
|---|---|---|---|
| CN | 100410733 C | * | 8/2008 |
| CN | 102143407 A | | 8/2011 |
| CN | 102282509 A | | 12/2011 |
| CN | 102820945 A | * | 12/2012 |
| CN | 103412367 A | | 11/2013 |
| CN | 103424894 A | * | 12/2013 |
| CN | 104049375 A | * | 9/2014 |
| CN | 104122674 A | * | 10/2014 |
| CN | 104238023 A | | 12/2014 |
| CN | 104297947 A | | 1/2015 |
| CN | 102820945 B | * | 9/2015 |
| CN | 105223647 A | | 1/2016 |
| CN | 104049375 B | * | 2/2016 |
| CN | 105393148 A | | 3/2016 |
| JP | H09264939 A | | 10/1997 |
| JP | H11167090 A | | 6/1999 |
| JP | 2012203334 A | | 10/2012 |
| JP | 2013530613 A | | 7/2013 |
| TW | 476012 B | | 2/2002 |
| WO | 0076103 A1 | | 12/2000 |
| WO | 2014209294 A1 | | 12/2014 |

OTHER PUBLICATIONS

Zou et al., An SOI based polarization insensitive filter for all-optical clock recovery, Optics Express, vol. 22, No. 6, p. 6647, 2014.*

Ng et al., Sagnac-loop phase shifter with polarization-independent operation, Review of Scientific Instruments 82, 013106 (2011).*

Chen et al., Full-duplex bidirectional data transmission link using twisted lights multiplexing over 1.1-km orbital angular momentum fiber, Scientific Reports | 16:38181 | DOI: 10.1038/srep38181.*

(56) References Cited

OTHER PUBLICATIONS

Liu et al., Demonstration of polarization-insensitive spatial light modulation using a single polarization-sensitive spatial light modulator; Scientific Reports, 2015.*
Ding et al., Polarization diversity DPSK demodulator on the silicon-on-insulator platform with simple fabrication, Optics Express, vol. 21, No. 6, p. 7828, 2013.*
Shieh et al., Theoretical and experimental study on PMD-supported transmission using polarization diversity in coherent optical OFDM systems, Optics Express, V. 15, N. 15 2007.*
Fukuda et al., Polarization Beam Splitter and Rotator for Polarization-Independent Silicon Photonic Circuit, 2007 (Year: 2007).*
Dai, D., et al., "Passive technologies for future large-scale photonic integrated circuits on silicon: polarization handling, light non-reciprocity and loss reduction," Light: Science & Applications (2012), 2012 CIOMP, pp. 1-12.
Zou, "An SOI Based Polarization Insensitive Filter for All-optical Clock Recovery," Optics Express, vol. 22, No. 6, Mar. 2014, pp. 6647-6652.
Foreign Communication From a Counterpart Application, PCT Application No. PCT/CN2017/110881, English Translation of International Search Report dated Jan. 31, 2018, 7 pages.
Foreign Communication From a Counterpart Application, PCT Application No. PCT/CN2017/110881, English Translation of Written Opinion dated Jan. 31, 2018, 4 pages.
Partial English Translation and Abstract of Chinese Patent Application No. CN102820945, Sep. 21, 2016, 4 pages.
Partial English Translation and Abstract of Chinese Patent Application No. CN104049375, Sep. 21, 2016, 6 pages.
Partial English Translation and Abstract of Chinese Patent Application No. CN104122674, Sep. 21, 2016, 6 pages.
Rajesh, K., "Data Center Network—Top of Rack (TOR) vs End of Row (EOR) Design," Feb. 9, 2012, 4 Pages.
Smith, D., et al., "Colourless 10Gb/s Reflective SOA-EAM with Low Polarization Sensitivity for Long-reach DWDM-PON Networks," ECOC 2009, Sep. 2009, Vienna, Austria, VDE VERLAG GMBH, 2 pgs.
Menezo, S., et al., "Reflective Silicon Mach Zehnder Modulator With Faraday Rotator Mirror effect for self-coherent transmission," OFC/NFOEC Technical Digest Optical Society of America, 2013, 3 pgs.
Watts, M., et al., "Low-Voltage, Compact, Depletion-Mode, Silicon Mach-Zehnder Modulator," IEEE Journal of Selected Topics in Quantum Electronics, vol. 16, No. 1, Jan.-Feb. 2010, pp. 159-164.
Patel, D., et al., "A Lumped Michelson Interferometric Modulator in Silicon," CLEO, Optical Society of America, 2014, 2 pages.
Zhang, J., et al., "A tunable polarization diversity silicon photonics filter," Optics Express, vol. 19, No. 14, Jul. 4, 2011, 10 pages.
Fukuda, H., et al., "Silicon photonic circuit with polarization diversity," Optics Express, vol. 16, No. 7, Mar. 31, 2008, 9 pages.
Foreign Communication From a Counterpart Application, PCT Application No. PCT/CN2016/080513, English Translation of International Search Report dated Aug. 1, 2016, 8 pages.
Foreign Communication From a Counterpart Application, PCT Application No. PCT/CN2016/080513, English Translation of Written Opinion dated Aug. 1, 2016, 4 pages.
Office Action dated Aug. 14, 2017, 13 pages, U.S. Appl. No. 15/601,706, filed May 22, 2017.
Office Action dated Apr. 23, 2018, 3 pages, U.S. Appl. No. 15/601,706, filed May 22, 2017.
Office Action dated Jan. 31, 2018, 25 pages, U.S. Appl. No. 15/601,706, filed May 22, 2017.
Office Action dated Feb. 6, 2018, 29 pages, U.S. Appl. No. 15/136,396, filed Apr. 22, 2016.
Office Action dated Sep. 8, 2017, 29 pages, U.S. Appl. No. 15/136,396, filed Apr. 22, 2016.
Wen, et al., "Polarization Insensitive Integrated Optical Modulator," U.S. Appl. No. 15/417,569, filed Jan. 27, 2017, 25 pages.
Wen, et al., "Polarization Insensitive Micro Ring Modulator," U.S. Appl. No. 15/601,706, filed May 22, 2017, 39 pages.

Dai, D., et al., "Passive technologies for future large-scale photonic integrated circuits on silicon: polarization handling, light non-reciprocity and loss reduction," Light: Science & Applications, 2012, 12 pages.
Office Action dated Sep. 7, 2018, 83 pages, U.S. Appl. No. 15/602,909, filed May 23, 2017.
Office Action dated Jun. 22, 2018, 29 pages, U.S. Appl. No. 15/417,569, filed Jan. 27, 2017.
Machine Translation and Abstract of Chinese Publication No. CN102143407, Aug. 3, 2011, 24 pages.
Machine Translation and Abstract of Chinese Publication No. CN105223647, Jan. 6, 2016, 35 pages.
Machine Translation and Abstract of Chinese Publication No. CN103412367, Nov. 27, 2013, 13 pages.
Machine Translation and Abstract of Chinese Publication No. CN104238023, Dec. 24, 2014, 12 pages.
Machine Translation and Abstract of Japanese Publication No. JP2012203334, Oct. 22, 2012, 11 pages.
Yao, S., "Polarization Insensitive Antenna Remoting Link with Frequency Conversion Gain," IEEE Photonics Technology Letters, vol. 12, No. 10, Oct. 2000, pp. 1382-1384.
Charbonnier, B., et al., "Silicon Photonics for Next Generation FDM/FDMA PON," J. Opt. Commun. Netw., vol. 4, No. 9, Sep. 2012, pp. A29-A37.
Esman, R.D., et al., "Polarization-Independent Fiber-Optic Microwave Modulator," Summer Tropical Meeting Digest on Optical Microvave Interactions, Jul. 19, 1993, pp. 31-32.
Foreign Communication From a Counterpart Application, PCT Application No. PCT/CN2018/087982, English Translation of International Search Report dated Aug. 14, 2018, 4 pages.
Foreign Communication From a Counterpart Application, PCT Application No. PCT/CN2018/087733, English Translation of International Search Report dated Sep. 5, 2018, 6 pages.
Foreign Communication From a Counterpart Application, PCT Application No. PCT/CN2018/087733, English Translation of Written Opinion dated Sep. 5, 2018, 4 pages.
Foreign Communication From a Counterpart Application, Japanese Application No. 2017-559501, Japanese Office Action dated Oct. 2, 2018, 8 pages.
Foreign Communication From a Counterpart Application, Japanese Application No. 2017-559501, English Translation of Japanese Office Action dated Oct. 2, 2018, 10 pages.
Machine Translation and Abstract of Japanese Publication No. JPH11167090, Jun. 22, 1999, 9 pages.
Foreign Communication From a Counterpart Application, PCT Application No. PCT/CN2018/073645, English Translation of International Search Report dated Apr. 23, 2018, 6 pages.
Foreign Communication From a Counterpart Application, PCT Application No. PCT/CN2018/073645, English Translation of Written Opinion dated Apr. 23, 2018, 5 pages.
Notice of Allowance dated Feb. 7, 2019, 23 pages, U.S. Appl. No. 15/601,706, filed May 22, 2017.
Foreign Communication From a Counterpart Application, European Application No. 17871334.3, Extended European Search Report dated Dec. 20, 2018, 6 pages.
Foreign Communication From a Counterpart Application, Chinese Application No. 201780005769.4, Chinese Office Action dated dated Sep. 10, 2019, 5 pages.
Machine Translation and Abstract of Japanese Publication No. JPH09264939, dated Oct. 7, 1997, 23 pages.
Dai, D., et al. "Novel concept for ultracompact polarization splitter-rotator based on silicon nanowires," Optics Express, vol. 19, No. 11, May 20, 2011, 11 pages.
Foreign Communication From a Counterpart Application, Chinese Application No. 201680026147.5, Chinese Office Action dated Jul. 31, 2019, 4 pages.
Foreign Communication From a Counterpart Application, European Application No. 18744526.7, Extended European Search Report dated Nov. 28, 2019, 8 pages.

* cited by examiner

WAVELENGTH DIVISION MULTIPLEXED POLARIZATION INDEPENDENT REFLECTIVE MODULATORS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In short reach optical networks, such as optical network implemented in datacenters, remote modulation with carrier distribution has been considered as a promising scheme in realizing a low-cost light source for data communication. To further reduce a cost of the light source, a single centralized light source may be shared among a plurality of components by utilizing a plurality of wavelengths of the centralized light source. In such cases, it may be desirable for modulators to properly modulate data onto a particular desired wavelength of the plurality of wavelengths of the centralized light source.

SUMMARY

Optical modulators of the prior art often have a problem of dependence on a polarization orientation of an incoming optical light. The inventive concepts disclosed herein solve the problem of the prior art by enabling polarization insensitive modulation of multiple wavelengths of a light beam, such as performed by a wavelength division multiplexed (WDM) polarization insensitive reflective modulator (PIRM), as discussed in greater detail below.

In one embodiment, the disclosure includes apparatus comprising a polarization beam splitter (PBS) optically coupled to a first light path and a second light path. The PBS is configured to receive a continuous wave (CW) light having a plurality of wavelengths, forward a first light beam of the CW light along the first light path, and forward a second light beam of the CW light along the second light path, wherein the first light beam comprises a first polarization that is perpendicular to a second polarization of the second light beam upon exiting the PBS. The apparatus also includes a first multiplexer coupled to the first light path and configured to de-multiplex the first light beam into a first plurality of channels, each corresponding to one of the plurality of wavelengths. The apparatus also includes a second multiplexer coupled to the second light path and configured to de-multiplex the second light beam into a second plurality of channels, each corresponding to one of the plurality of wavelengths. The apparatus also includes a first optical modulator coupled to the first multiplexer and the second multiplexer and configured to modulate, by an electrical signal, a first channel of the first plurality of channels and a second channel of the second plurality of channels, wherein a wavelength of the first channel of the first plurality of channels and the second channel of the second plurality of channels is the same.

In some embodiments, the disclosure also includes wherein modulating the first channel and the second channel comprises receiving the first channel of the first plurality of channels via a first side of the first optical modulator from the first multiplexer, receiving the second channel of the second plurality of channels via a second side of the first optical modulator from the second multiplexer, modulating the first channel to generate a first modulated channel, modulating the second channel to generate a second modulated channel, outputting the first modulated channel to the second multiplexer via the second side of the first optical modulator, and outputting the second modulated channel to the first multiplexer via the first side of the first optical modulator, and/or further comprising a second optical modulator coupled to the first multiplexer and the second multiplexer and configured to receive a third channel of the first plurality of channels via a first side of the second optical modulator from the first multiplexer, receive a fourth channel of the second plurality of channels via a second side of the second optical modulator from the second multiplexer, modulate the third channel to generate a third modulated channel, modulate the fourth channel to generate a fourth modulated channel, output the third modulated channel to the second multiplexer via the second side of the second optical modulator, and output the fourth modulated channel to the first multiplexer via the first side of the second optical modulator, and/or wherein the first multiplexer is further configured to multiplex the second modulated channel and the fourth modulated channel to form a second modulated light beam, and wherein the second multiplexer is further configured to multiplex the first modulated channel and the third modulated channel to form a first modulated light beam, and/or wherein the PBS is further configured to combine the first modulated light beam and the second modulated light beam into a modulated optical signal, and forward the modulated optical signal in an opposite direction to a direction in which the CW light was received, and/or further comprising a polarization rotator (PR) positioned along the first light path and configured to rotate the first polarization of the first light beam to be parallel to the second polarization of the second light beam, and/or wherein the PBS and the PR are comprised in polarization splitter rotator (PSR), and/or wherein. the PBS, the first multiplexer, the second multiplexer, and the first optical modulator are comprised in a WDM PIRM, and wherein the apparatus further comprises an optical circulator coupled to the WDM PIRM, a downlink communication medium coupled to the optical circulator, and a splitter coupled to the optical circulator, and/or wherein the WDM PIRM receives the CW light from the splitter via the optical circulator and forwards a modulated optical signal to the downlink communication medium via the optical circulator, and/or wherein the PBS is coupled to the first multiplexer via a first optical waveguide, and wherein the PBS is coupled to the second multiplexer via a second optical waveguide.

In another embodiment, the disclosure includes an apparatus comprising an optical circulator configured to receive and forward optical communications and a WDM PIRM coupled to the optical circulator. The WDM PIRM is configured to receive a CW light comprising a plurality of optical wavelengths from the optical circulator, split the CW light into a first light beam and a second light beam, filter the first light beam to obtain a first channel having a first wavelength, filter the second light beam to obtain a second channel having the first wavelength, modulate an electrical signal onto the first channel to form a first modulated channel and the second channel to form a second modulated channel, combine the first modulated channel and the second modulated channel to create a modulated signal, and forward the modulated optical signal to a downstream device via the optical circulator. In some embodiments the disclosure also includes wherein the second light beam comprises a second polarization orthogonal to a first polarization of the first light beam, and wherein the WDM PIRM is further configured to rotate the second polarization to be parallel to the first polarization and modulate both the first channel and the second channel substantially simultaneously, and/or wherein the WDM PIRM comprises a first multiplexer configured to de-multiplex the first light beam to obtain the first channel, and a second multiplexer configured to de-multiplex the second light beam to obtain the second channel, and/or wherein the WDM PIRM further comprises a modulator configured to modulate the electrical signal onto the first channel to form the first modulated channel and the second channel to form the second modulated channel substantially simultaneously, and/or wherein the WDM PIRM comprises a first ring resonator configured to drop the first channel from the first light beam, and a second ring resonator configured to drop the second channel from the second light beam, and/or wherein the WDM PIRM further comprises a thermal mechanism configured to heat at least one of the first ring resonator or the second ring resonator to determine the first wavelength, and/or wherein the WDM PIRM comprises a ring resonator configured to filter the first light beam to obtain the first channel having the first wavelength, filter the second light beam to obtain a second channel having the first wavelength, and modulate the electrical signal onto the first channel to form the first modulated channel and the second channel to form the second modulated channel substantially simultaneously.

In yet another embodiment, the disclosure includes a method comprising receiving an CW light having multiple wavelengths, splitting the CW light into a first light beam and a second light beam, filtering the first light beam and the second light beam to obtain a first channel and a second channel, wherein the first channel and the second channel include a same wavelength of the multiple wavelengths of the CW light, modulating an electrical signal onto the first channel and the second channel to form first and second modulated channels, and combining the first modulated channel and the second modulated channel to create a modulated optical signal. In some embodiments the disclosure also includes wherein each of the multiple wavelengths of the CW light is filtered from the first light beam and the second light beam and individually modulated substantially simultaneously, and/or further comprising rotating a second polarization of the second light beam to be parallel to a first polarization of the first light beam prior to filtering.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments that provide for polarization independent modulation of multiple wavelengths of a CW light. The disclosed embodiments facilitate sharing of an optical light source, as well as sharing of optical resources (e.g., sharing one or more optical processing components used to modulate a plurality of the multiple wavelengths of the CW light). The disclosed embodiments further provide for a WDM PIRM configured to split the CW light including multiple wavelengths into a plurality of channels each at a single wavelength of the multiple wavelengths, modulate each channel, and recombine the modulated channels to form an optical signal for transmission from the WDM PIRM to another component in an optical system. The WDM PIRM is further configured to rotate a polarization of at least a portion of the CW light to compensate for a polarization dependence of a modulator used to modulate the channels split from the CW light.

Figure 1:
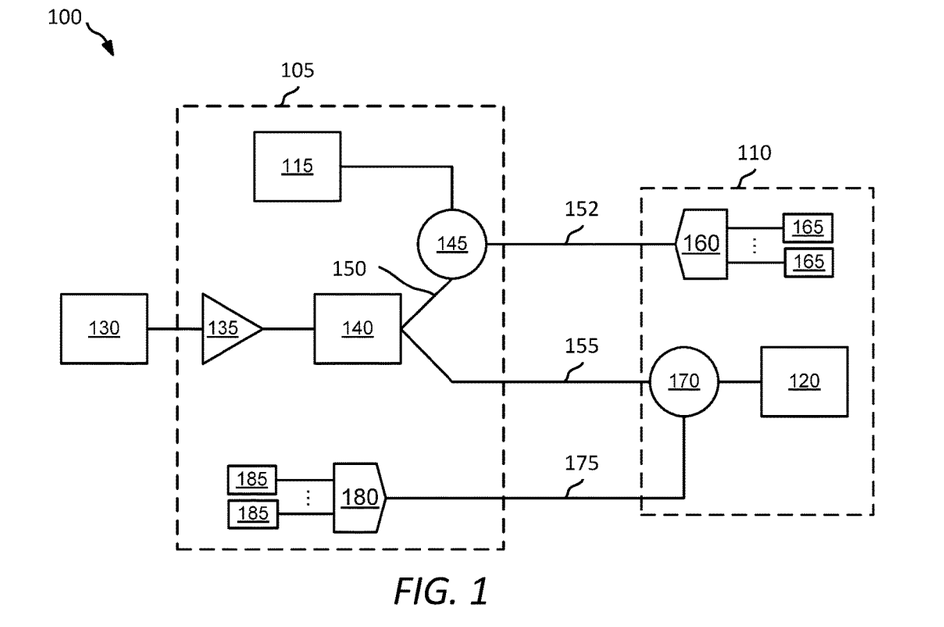
FIG. 1 is a schematic diagram of an embodiment of a datacenter network configured to employ WDM PIRMs.

FIG. 1 is a schematic diagram of an embodiment of a datacenter network 100 configured to employ WDM PIRMs. The datacenter network 100 comprises a plurality of rack servers 110, which are hardware devices that provide services to clients, for example, by providing applications, operating software, virtualization, cloud computing, etc. Although only one rack server 110 is shown, multiple rack servers 110 may be present in the datacenter network 100. Each rack of the rack servers 110 may be interconnected by a Top of Rack (TOR) switch (not shown). The TOR switches and rack servers 110 may be organized in rows, such that each row is connected to an End of Row (EOR) switch 105. The EOR switch 105 is any device capable of connecting other devices by performing packet switching across an optical network. The EOR switch 105 is then coupled (e.g., via an optical communication coupling such as a laser light source), to a core network (not shown) allowing the rack servers 110 to communicate with clients via the EOR switch 105 and the core network. In an embodiment, EOR switch 105 and rack servers 110 each comprise optical modulators 115 and 120, respectively, to provide a modulated CW light for use by the EOR switch 105 and/or the rack servers 110 for downlink communication, uplink communication, or both.

The light source 130 may be any optical light source that transmits a CW light including a plurality of wavelengths ($\lambda_1, \lambda_2, \ldots, \lambda_N$) to the EOR switch 105. Each wavelength of the CW light may, in some embodiments, be referred to as an optical carrier. In some embodiments, the light source 130 is implemented as a dense-wavelength division multiplexing (DWDM) CW light source. The CW light from the light source 130 is forwarded to the EOR switch 105. Optionally, the CW light may be amplified within the EOR switch 105 by an optical amplifier 135, for example, by amplifying a power and/or luminance of the CW light received from the light source 130. Alternatively, the optical amplifier 135 may be located external to the EOR switch 105 and coupled to both the light source 130 and the EOR switch 105. Examples of optical amplifiers suitable for implementation as the optical amplifier 135 include, but are not limited to, semiconductor optical amplifiers (SOAs), reflective-type SOAs (RSOAs), erbium doped fiber amplifiers (EDFAs), and the like.

The amplified CW light is forwarded from the optical amplifier 135 through a splitter 140 to result in uplink carriers 155 and downlink carriers 150. The splitter 140 is any device configured to split a light (e.g., the CW light from the light source 130) into multiple portions, for example, into multiple copies with reduced power and/or luminance. In some embodiments, the splitter 140 may be referred to as a power divider. The uplink carriers 155 are forwarded from the splitter 140 to the rack servers 110 and the downlink carriers 150 are forwarded from the splitter 140 to an optical modulator 115 for modulation prior to forwarding to the rack servers 110. The EOR switch 105 further comprises an optical circulator (OC) 145 coupled to the splitter 140, the rack servers 110, and the optical modulator 115 (which contains one or more WDM PIRMs for modulation of optical carriers (e.g., wavelengths of an optical light such as a CW light) to form optical signals). The OC 145 may be any device capable of separating/combining optical carriers or wavelengths traveling in a downstream direction from/with the optical signals traveling in an upstream direction across a single fiber. Alternatively, in some embodiments, the OC 145 may be an optical coupler or any other suitable optical splitting/combining device. The downlink carriers 150 pass from the splitter 140, through the OC 145, to optical modulator 115. The optical modulator 115 splits the downlink carriers 150 into N carriers by wavelength, individually modulates each of the N carriers via WDM PIRMs to form N corresponding signals, and combines the N signals to form downlink signals 152 that are now modulated. The optical modulator 115 then forwards the downlink signals 152, through the OC 145, to the rack servers 110.

The rack servers 110 comprise a multiplexer (mux) 160 and downlink (DL) receivers (Rxs) 165. The mux 160 may be any device capable of combining a plurality of optical carriers/signals of different wavelength into a single fiber and/or capable of splitting multiple wavelengths from a single fiber into a plurality of fibers according to wavelength. The mux 160 splits the downlink signals 152 by wavelength and forwards each respective wavelength of the split downlink signals 152 to the DL Rxs 165 to be received and converted by the DL Rxs 165 to electrical downlink data. The rack servers 110 also comprise an OC 170 and an optical modulator 120, which are substantially similar to OC 145 and optical modulator 115, respectively. The uplink carriers 155 are forwarded to the optical modulator 120 via the OC 170. The optical modulator 120 splits the uplink carriers 155 by wavelength, modulates the split carriers via WDM PIRMs to form individual uplink signals, combines the individual uplink signals to form uplink signals 175, and forwards the uplink signals 175 for transmission to the EOR switch 105 in a manner similar to that of optical modulator 115. The EOR switch 105 receives the uplink signals 175 at mux 180. The mux 180 splits the uplink signals 175 by wavelength and forwards each respective wavelength of the split uplink signals to the uplink (UP) Rxs 185 to be received and converted by the UP Rxs 185 to electrical uplink data. It should be noted that in some embodiments, mux 160, DL Rxs 165, OC 170, and optical modulator 120 are implemented in a TOR, and in some embodiments mux 160, DL Rxs 165, OC 170, and optical modulator 120 are implemented in a single rack server 110 or distributed across a plurality of rack servers 110.

Figure 2:
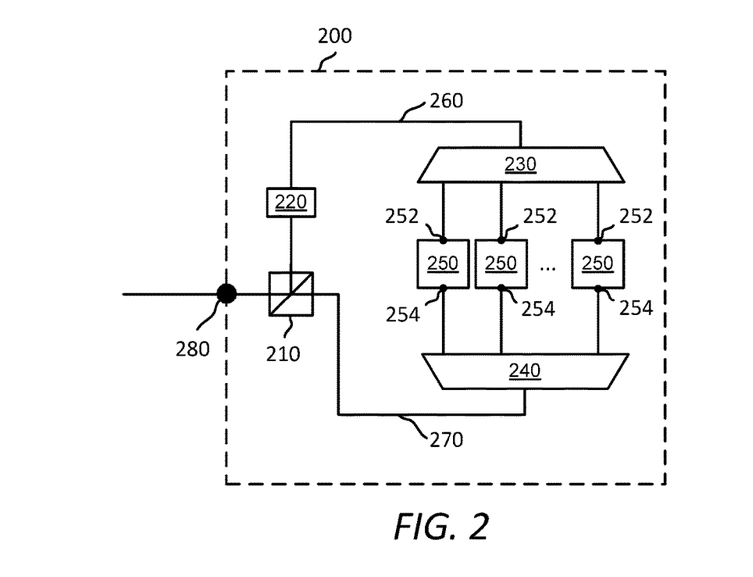
FIG. 2 is a schematic diagram of an embodiment of a WDM PIRM.

FIG. 2 is a schematic diagram of an embodiment of a WDM PIRM 200. In some embodiments, the WDM PIRM 200 is operable as an optical modulator 115 and/or an optical modulator 120, described above. The WDM PIRM 200 is configured to receive a light that includes multiple wavelengths (e.g., a CW light including multiple wavelengths or carriers), separate the multiple wavelengths, modulate each wavelength with electrical data, and recombine the wavelengths for transmission. The WDM PIRM 200 comprises a PBS 210, a PR 220, a first mux 230, a second mux 240, and a plurality of modulators 250. The PBS 210 is coupled to an input port 280 of the WDM PIRM 200, the PR 220, and the second mux 240. The PR 220 is coupled to the first mux 230. Each of the first mux 230 and the second mux 240 are coupled to a plurality of modulators 250 such that the first mux 230 is coupled to a first side 252 of the modulators 250 and the second mux 240 is coupled to a second side 254 of the modulators 250.

The WDM PIRM 200 receives, at the input port 280, a CW light from a light source (such as the light source 130, shown in FIG. 1) that contains one or more wavelengths and forwards the CW light to the PBS 210. The PBS 210 may be any device configured to split a light into two orthogonally polarized light beams and output the polarized light beams along first light path 260 (in a clockwise direction) and second light path 270 (in a counter clockwise direction), respectively. The CW light may be linearly polarized upon leaving the remote device, but may become elliptically polarized during transmission to the WDM PIRM 200. For example, the CW light may comprise a single optical polarization component, such as a transverse electric (TE) polarization, but portions of the CW light may rotate into a transverse magnetic (TM) polarization when traversing an optical fiber. After receiving the CW light, the PBS 210 splits the CW light into a first light beam having a TM polarization and a second light beam having a TE polarization. The PBS 210 forwards the first light beam via first light path 260 and forwards the second light beam via the second light path 270. When light beams exit the PBS 210, light beams forwarded in the clockwise direction (e.g., between the PBS 210 and the PR 220 along first light path 260) contains whatever portion of the CW light that comprises a polarization that is perpendicular to light beams forwarded in the counter clockwise direction (e.g., between the PBS 210 and the second mux 240 along second light path 270). The first light path 260 and the second light path 270 may comprise any medium having a refractive index suitable for communicating a CW light (e.g., containing multiple optical carriers or wavelengths) and/or an optical signal, for example, an optical waveguide (e.g., a silicon waveguide), glass (e.g., fiber-optic cabling), etc.

The PR 220 is positioned along the first light path 260 between the PBS 210 and the first mux 230. PR 220 may be any device configured to rotate the polarization of a polarized light beam by a specified angle, such as, for example, a Faraday rotator or a mode converter. PR 220 rotates the polarization of the first light beam so that the first light beam when exiting the PR 220 is polarized in parallel with the second light beam forwarded along second light path 270 in the counter clockwise direction (e.g., a 90 degree rotation). In other words, PR 220 converts the TM polarization of the first light beam into a TE polarization so that the first and second light beams comprise the same polarization when received at the first mux 230 and second mux 240, respectively. After rotating the polarization of the first light beam, the PR 220 forwards the first light beam along the first light path 260 to the first mux 230.

The first mux 230 and the second mux 240 (which may each be a multiplexer, a de-multiplexer, and/or both) may be any suitable multiplexer such as, for example, an arrayed waveguide grating (AWG) multiplexer, a micro-ring resonator (MRR) multiplexer, or the like. The first mux 230 and the second mux 240 receive the first light beam and the second light beam, respectively, and de-multiplex the light beams to split the first light beam and the second light beam into multiple channels, where each channel includes one wavelength of the plurality of wavelengths contained in the CW light received by the WDM PIRM 200. For example, when the CW light received by the WDM PIRM 200 includes N wavelengths, the first mux 230 splits the first light beam into N channels and the second mux 240 splits the second light beam into the same N channels. The first mux 230 and the second mux 240 forward each channel of the N channels to the modulators 250. For example, the first mux 230 forwards each of the N channels to the first side 252 of the modulators 250 and the second mux 240 forwards each of the N channels to the second side 254 of the modulators 250. A quantity of the modulators 250 may be determined according to the number of channels into which the first mux 230 and the second mux 240 divide the first light beam and the second light beam, respectively. For example, for a CW light received by the WDM PIRM 200 that includes N wavelengths, which is divided into N corresponding channels, the WDM PIRM 200 may include N modulators 250, where each of the modulators 250 uniquely corresponds to one of the N channels.

The modulators 250 may be any device capable of modulating an electrical signal onto an optical carrier or wavelength of the CW light. For example, the modulators 250 may be implemented as any silicon waveguide based modulator, a single lumped modulator, a Mach-Zehnder modulator (MZM), an In-phase Quadrature (IQ) modulator, an electro-absorption modulator, a micro-ring resonator based modulator, etc. The modulators 250 are configured to receive the N channels of the first light beam at the first side 252 and receive the N channels of the second light beam at the second side 254. As channels of the first light beam and the second light beam pass in both directions through the modulators 250, the modulator 250 substantially simultaneously modulates an electrical signal onto both the channels of the first light beam and the channels of the second light beam. Additionally, the modulators 250 may substantially simultaneously modulate both the channels of the first light beam and the channels of the second light beam for each wavelength of the plurality of wavelengths substantially simultaneously. The electrical signal may be provided by any one or more electrical components, the details of which are not limited herein. The modulator 250 may be selected to be temperature insensitive and polarization sensitive. However, because PR 220 has rotated the TM polarization of the first light beam into a TE polarization, both the first light beam and the second light beam share the same polarization. Accordingly, the modulator 250 can modulate both the first light beam and the second light beam despite the light beams being received from opposite directions.

Modulated light beams exit the modulators 250 from opposite sides, such that the first modulated light beam (e.g., a first modulated channel) leaves the second side 254 of the modulators 250 in the clockwise direction and the second modulated light beam (e.g., a second modulated channel) leaves the first side 252 of the modulators 250 in the counter clockwise direction. For example, the modulators 250 receive the channels of the first light beam along the first light path 260 from the first mux 230 via the first side 252 of the modulators 250, modulate the electrical signal on the channels of the first light beam, and forward the channels of the first light beam to the second mux 240 via the second side 254 of the modulators 250. Similarly, the modulators 250 receive the channels of the second light beam along the second light path 270 from the second mux 240 via the second side 254 of the modulators 250, modulate the electrical signal on the channels of the second light beam, and forward the channels of the second light beam to the first mux 230 via the first side 252 of the modulators 250. The first modulated light beam continues clockwise around the optical circuit via the second light path 270 and the second modulated light beam continues counter clockwise around the optical circuit via the first light path 260. The first mux 230 and the second mux 240 receive the channels of the second light beam and the first light beam, respectively, from the modulators 250 and multiplex the channels of the second light beam and the first light beam to recombine the second light beam and the first light beam. The first mux 230, after recombining the second light beam, forwards the second light beam to the PR 220 and the second mux 240, after recombining the first light beam, forwards the first light beam to the PBS 210. The PR 220 receives the second modulated light beam from the first mux 230, rotates the second modulated light beam (e.g., a 90 degree rotation) to rotate the TE polarization of the second modulated light beam to a TM polarization, and forwards the second modulated light beam to the PBS 210. The modulated light beams in both directions are both received by the PBS 210 and combined into a modulated optical signal, which is then transmitted from the WDM PIRM 200 via the same communication medium over which the WDM PIRM 200 received the CW light. By employing the optical circuit of WDM PIRM 200, the dependence of polarization on an incoming CW light having a plurality of wavelengths for modulation is eliminated. Additionally, in some embodiments, PR 220 may instead be positioned on the second light path 270 with the PBS 210 TM polarization output connected to the second light path 270, without causing a change in the optical signal output from the WDM PIRM 200.

Figure 3:
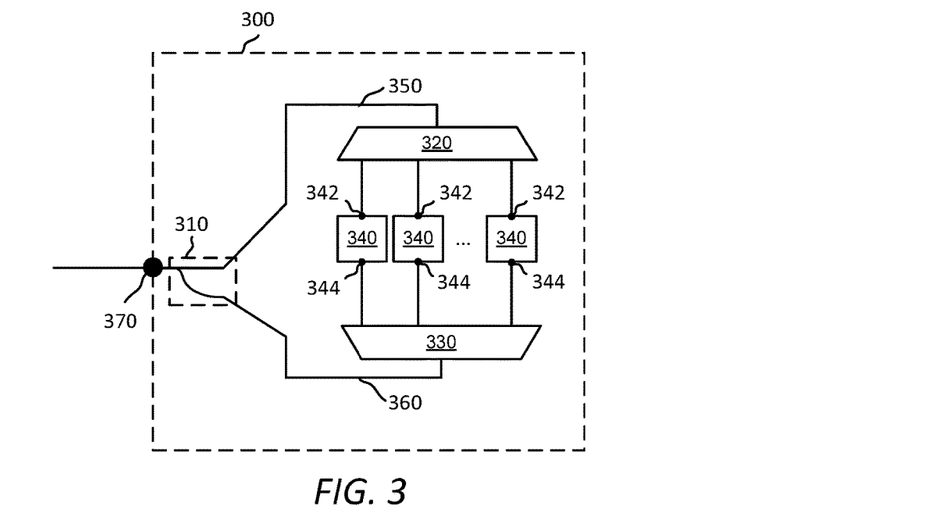
FIG. 3 is a schematic diagram of another embodiment of a WDM PIRM.

FIG. 3 is a schematic diagram of another embodiment of a WDM PIRM 300. The WDM PIRM 300 comprises a PSR 310, a first mux 320, a second mux 330, modulators 340, a first light path 350, and a second light path 360. The first mux 320, second mux 330, modulators 340, first light path 350, and second light path 360 may be coupled and configured to operate in a manner substantially similar to the first mux 230, second mux 240, modulators 250, first light path 260, and second light path 270, respectively, discussed above in reference to FIG. 2, and such description is not repeated herein. The PSR 310 is coupled to an input port 370 of the WDM PIRM 300, the first mux 320 via the first light path 350, and the second mux 330 via the second light path 360. The WDM PIRM 300 receives, at the input port 370, a CW light from a light source (such as the light source 130, shown in FIG. 1) that contains one or more wavelengths and forwards the CW light to the PSR 310. The PSR 310 may be any device configured to split a CW light into two orthogonally polarized light beams and rotate a TM polarization component of the light beams to form a TE polarization component prior to forwarding the polarized light beams along light paths 350 (in a clockwise direction) and 360 (in a counter clockwise direction), respectively. For example, in some embodiments the PSR 310 is operable as a combination PBS 210 and PR 220, configured to function as discussed above in reference to FIG. 2. The modulators 340 may be any suitable optical modulators configured to receive a light beam at one of a first side 342 or second side 344, modulate the light beam with electrical data, and pass the modulated light beam to another component via a side from which the light beam was not received, the side being selected from the first side 342 or the second side 344.

Figure 4:
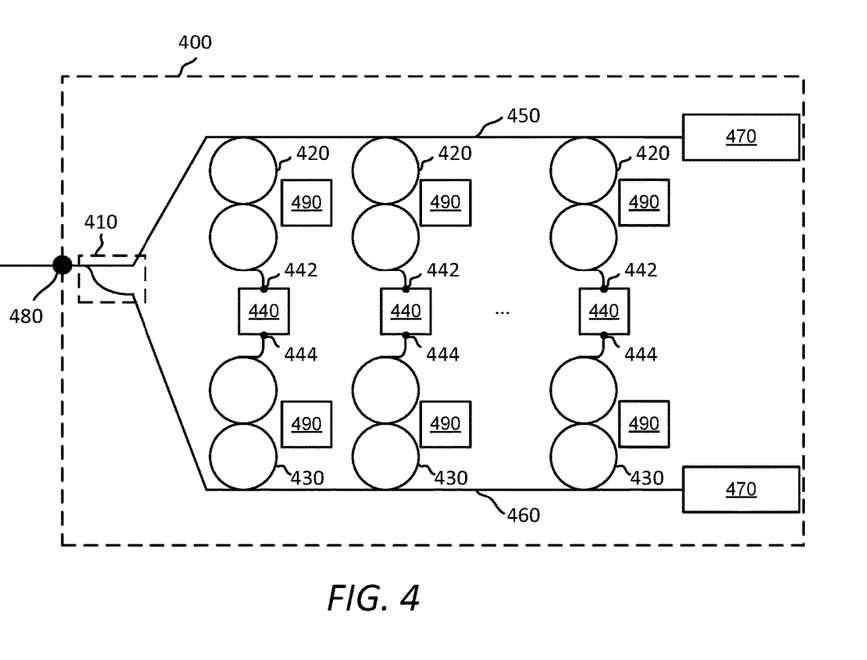
FIG. 4 is a schematic diagram of another embodiment of a WDM PIRM.

FIG. 4 is a schematic diagram of another embodiment of a WDM PIRM 400. The WDM PIRM 400 comprises a PSR 410, first ring resonator 420, second ring resonator 430, modulator 440, a first light path 450, a second light path 460, and absorbers 470. The WDM PIRM 400 is configured to receive a CW light that includes multiple wavelengths, separate the multiple wavelengths, modulate each wavelength, and recombine the wavelengths for transmission. The PSR 410, which may be substantially similar to the PSR 310, is configured to split and rotate the CW light received by the WDM PIRM 400 at an input port 480 into a first light beam having a TE polarization and a second light beam having a TE polarization. It should be noted that the PSR 410 may be replaced by a PBS and a PR, for example, as discussed above in reference to FIG. 2. The PSR 410 forwards the first light beam along the first light path 450 and forwards the second light beam along the second light path 460 (each of which may be, for example, a waveguide such as a silicon waveguide). Each of the first light path 450 and the second light path 460 may, in some embodiments, comprise a waveguide bus capable of bi-directionally transmitting a CW light containing optical carriers or optical signals to, or from, one or more ring resonators (e.g., one or more first ring resonators 420 and/or one or more second ring resonators 430). For example, a first light path 450 and a second light path 460 each implemented as a waveguide bus may enable the first and second ring resonators, respectively, to remove a channel of light at a given wavelength (e.g., an unmodulated channel of light) from a light beam, or add a channel of light at a given wavelength (e.g., a modulated channel of light) to the light beam by splitting light off of the waveguide bus or forwarding light toward the waveguide bus.

The first ring resonator 420 and the second ring resonator 430 are coupled to the first light path 450 and the second light path 460, respectively. The first ring resonator 420 is further coupled to a first side 442 of the modulator 440 and the second ring resonator 430 is further coupled to a second side 444 of the modulator 440. Each ring of the first ring resonator 420 and the second ring resonator 430 is configured to resonate at a particular wavelength and may be, for example, a waveguide (such as a silicon waveguide) curved to form a ring through which optical signals may pass. It should be understood that while both the first ring resonator 420 and the second ring resonator 430 are illustrated in FIG. 4 as including two rings (e.g., dual-coupled ring resonators), the first ring resonator 420 and the second ring resonator 430 may include any number of rings (e.g., one ring, three rings, four rings, etc.) based on a desired performance of the first ring resonator 420 and the second ring resonator 430. For example, including a greater number of rings in each of the first ring resonator 420 and the second ring resonator 430 may result in a more precise (e.g., sharper) frequency response at a particular wavelength (e.g., a wavelength which the first ring resonator 420 and the second ring resonator 430 are each configured to resonate). Additionally, in some embodiments the WDM PIRM 400 includes a plurality of first ring resonators 420, second ring resonators 430, and modulators 440 such that a quantity of the first ring resonators 420, the second ring resonators 430, and modulators 440 in the WDM PIRM 400 corresponds to a quantity of the multiple wavelengths included in the CW light. In such embodiments, each coupled set of first ring resonator 420, second ring resonator 430, and modulator 440 may be configured to interact with a particular one of the multiple wavelengths of the CW light. For example, to designate or select a particular wavelength of the multiple wavelengths of the CW light with which the first ring resonators 420 and the second ring resonators 430 interact, the first ring resonators 420 and the second ring resonators 430 may be tuned to a particular desired wavelength. Such tuning (which may also be referred to as bias controlling) is performed, in some embodiments, by associating a thermal mechanism 490 (e.g., a heater) with each of the first ring resonators 420 and the second ring resonators 430 (e.g., by positioning the thermal mechanisms 490 in proximity to, or in contact with, the first ring resonators 420 and the second ring resonators 430) and controlling a temperature of each thermal mechanism 490 to tune the first ring resonators 420 and the second ring resonators 430. In some embodiments, each of the first ring resonators 420 and the second ring resonators 430 may have independent (or dedicated) thermal mechanisms 490, while in other embodiments a first ring resonator 420 and a second ring resonators 430 that are coupled to a same modulator 440 may share a single thermal mechanism 490.

The first ring resonator 420 and the second ring resonator 430 are configured to interact with the first light path 450 and the second light path 460, respectively, such that one of the multiple wavelengths of the first light beam is forwarded through the first ring resonator 420 to the modulator 440 and one of the multiple wavelengths of the second light beam is forwarded through the second ring resonator 430 to the modulator 440. As such, in some embodiments the first ring resonators 420 and the second ring resonators 430 may function substantially similar to an optical filter configured to pass (or drop) an optical signal having a particular wavelength in the multiple wavelengths included in the CW light from a remainder of the multiple wavelengths. It should be noted that for any given coupled set of first ring resonator 420, second ring resonator 430, and modulator 440, the first ring resonator 420 and the second ring resonator 430 are configured to interact with a substantially same wavelength of the multiple wavelengths of the CW light. For example, when the CW light received by the WDM PIRM 400 includes N wavelengths, the first ring resonator 420 receives the first light beam from the PSR 410 and filters (or drops) a first channel of the first light beam and the second ring resonator 430 receives the second light beam from the PSR 410 and filters (or drops) a second channel of the second light beam, where the first channel and the second channel have substantially the same wavelength. Similarly, subsequent first ring resonators 420 and second ring resonators filter additional channels from the first light beam and the second light beam, respectively, until all wavelengths have been filtered from the first light beam and the second light beam. After filtering the first light beam and the second light beam into channels, the first ring resonator 420 and the second ring resonator 430 forward the first channel and the second channel, respectively, to the modulator 440. The first channel and the second channel are forwarded to the modulator 440, in some embodiments, via a waveguide (such as a silicon waveguide) or other optical medium. For example, the first ring resonator 420 forwards the first channel to the first side 442 of the modulator 440 and the second ring resonator 430 forwards the second channel to the second side 444 of the modulator 440.

The modulator 440 may be any device capable of modulating an electrical signal onto a received CW light. For a WDM PIRM 400 including multiple modulators 440, each modulator 440 may be implemented as an individual modulator, independent of a remainder of the modulators 440. For example, the modulators 440 may be implemented as any silicon waveguide based modulator, a single lumped modulator, a MZM, an IQ modulator, an electro-absorption modulator, a micro-ring resonator based modulator, etc. As discussed above, a quantity of modulators 440 included in the WDM PIRM 400 may be determined according to the number of first ring resonators 420 and second ring resonators 430 included in the WDM PIRM 400 (and correspondingly a number of wavelengths included in the CW light received by the WDM PIRM 400). For example, for a CW light including N wavelengths, for which the WDM PIRM 400 includes N first ring resonators 420 and N second ring resonators 430, the WDM PIRM 400 also includes N modulators 440, where each of the first ring resonators 420, second ring resonators 430, and modulators 440 uniquely corresponds to one of the N channels.

The modulator 440 is configured to receive the first and second channels at a first side 442 and a second side 444 of the modulator 440, respectively, and modulate the first and second channels to form first and second modulated channels. As the first channel and the second channel pass in both directions through the modulator 440, the modulator 440 substantially simultaneously modulates both the channels of the first light beam and the channels of the second light beam, using an electrical signal, to form the first and second modulated channels. The electrical signal may be provided by any one or more electrical components, the details of which are not limited herein. The modulator 440 may be selected to be temperature insensitive and polarization sensitive. However, because PSR 410 has rotated the TM polarization of the second light beam into a TE polarization, both the first light beam and the second light beam share the same polarization. Accordingly, the modulator 440 can modulate both the first light beam and the second light beam despite the light beams being received from opposite directions.

Modulated channels exit the modulator 440 from opposite ends, such that the first modulated channel leaves the second side 444 of the modulator 440 in the clockwise direction toward the second ring resonator 430 and the second modulated channel leaves the first side 442 of the modulator 440 in the counter clockwise direction toward the first ring resonator 420. For example, the modulator 440 receives the first channel from the first ring resonator 420 via the first side 442 of the modulator 440, modulates the electrical signal onto the first channel to form the first modulated channel, and forwards the first modulated channel to the second ring resonator 430 via the second side 444 of the modulator 440. Similarly, the modulator 440 receives the second channel from the second ring resonator 430 via the second side 444 of the modulator 440, modulates the electrical signal onto the second channel to form the second modulated channel, and forwards the second modulated channel to the first ring resonator 420 via the first side 442 of the modulator 440. The first ring resonator 420 and the second ring resonator 430 forward the second modulated channel and the first modulated channel to the first light path 450 and the second light path 460, respectively. The second modulated channel and the first modulated channel are combined on the first light path 450 and the second light path 460, respectively, to form a first modulated light beam and a second modulated light beam that is forwarded to the PSR 410.

The PSR 410 receives the first modulated light beam via the second light path 460, rotates the first modulated light beam (e.g., a 90 degree rotation) to rotate the TE polarization of the first modulated light beam to a TM polarization, and combines the first modulated light beam with the second modulated light beam, received via the first light path 450, to form a modulated optical signal. The modulated optical signal is then forwarded from the WDM PIRM 400 via the same communication medium over which the WDM PIRM 400 received the CW light. By employing the optical circuit of the WDM PIRM 400, the dependence of polarization on an incoming CW light having a plurality of wavelengths for modulation is eliminated. Absorbers 470 are coupled to the first light path 450 and the second light path 460 and configured to absorb residual light (e.g., light from the first or second light beams or modulated light beams on the first light path 450 and/or the second light path 460) that is not filtered or dropped from the first light beam or the second light beam by the first rings resonators 420 or the second ring resonators 430.

Figure 5:
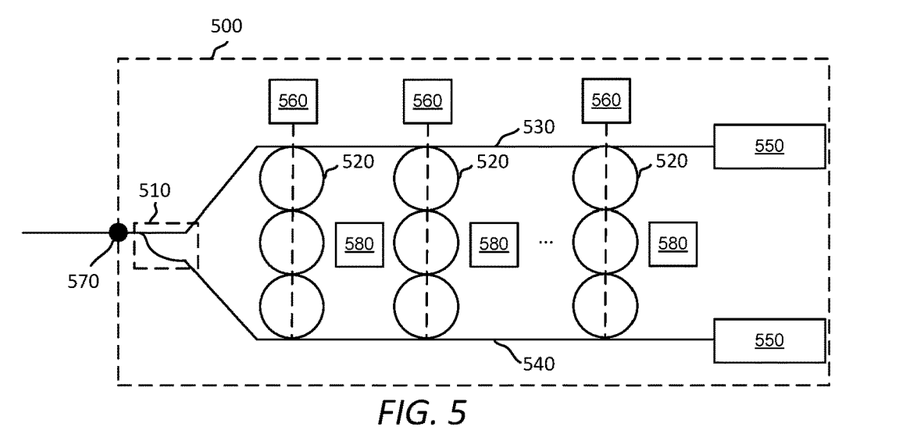
FIG. 5 is a schematic diagram of another embodiment of a WDM PIRM.

FIG. 5 is a schematic diagram of another embodiment of a WDM PIRM 500. The WDM PIRM 500 comprises a PSR 510, ring resonator 520, a first light path 530, a second light path 540, and absorbers 550. The WDM PIRM 500 is configured to receive a CW light that includes multiple wavelengths, separate the multiple wavelengths, modulate each wavelength, and recombine the wavelengths for transmission. The PSR 510, which may be substantially similar to the PSR 310, is configured to split and rotate a CW light received by the WDM PIRM 500 at an input port 570 into a first light beam having a TE polarization and a second light beam having a TE polarization. It should be noted that the PSR 510 may be replaced by a PBS and a PR, for example, as discussed above in reference to FIG. 2. The PSR 510 forwards the first light beam along the first light path 530 and forwards the second light beam along the second light path 540 (each of which may be, for example, a waveguide, such as a silicon waveguide, and may operate as discussed above with respect to FIG. 4).

The ring resonator 520 is coupled between the first light path 530 and the second light path 540 and configured to interact with the first light path 530 and the second light path 540 to filter (or drop) a channel having one wavelength of the multiple wavelengths of the CW light from the first light beam and the second light beam. Although illustrated as having three rings, the ring resonator 520 may include any odd number of rings (e.g., 1, 3, 5, etc.) to provide a desired frequency response in interacting with a wavelength of the multiple wavelengths of the CW light, as discussed above with respect to FIG. 4. The WDM PIRM 500 may include a plurality of ring resonators 520, for example, based on a number of wavelengths which the WDM PIRM 500 is configured to modulate. For example, for a CW light including N wavelengths, which is divided into N corresponding channels, the WDM PIRM 500 may include N ring resonators 520, where each of the ring resonators 520 uniquely corresponds to one of the N channels such that each of the N channels is filtered from the first light path 530 and the second light path 540 by a ring resonator 520. The ring resonator 520 may be configured to interact with a particular wavelength of the multiple wavelengths of the CW light, for example, by using a thermal mechanism 580 to perform tuning, as discussed above with respect to FIG. 4.

The ring resonator 520 filters a first channel having a particular wavelength from the first light path 530 and a second channel at the same particular wavelength from the second light path 540. The ring resonator 520 is further configured to modulate electrical data onto the first and second channels. For example, one or more rings of the ring resonator 520 are coupled to an electrical source 560. The electrical source 560 is configured to introduce a variable electrical bias to the one or more rings of the ring resonator 520, thereby altering an optical performance of the one or more rings of the ring resonator 520. Such an altered performance results in fluctuations in a power level of the first and second channels that is introduced to the first and second channels as the first and second channels pass through the ring resonator 520. By manipulating the variable electrical bias provided by the electrical source 560 (e.g., by turning the variable electrical bias on or off based on a content of data being modulated onto the first and second channels), the electrical source 560 causes the ring resonator 520 to modulate the data onto the first and second channels as variations in power, respectively. The ring resonator 520 forwards the first modulated channel to the second light path 540 and the second modulated channel to the first light path 530. The second modulated channel and the first modulated channel are combined on the first light path 530 and the second light path 540, respectively, to form a first modulated light beam and a second modulated light beam that is forwarded to the PSR 510.

The PSR 510 receives the first modulated light beam via the second light path 540, rotates the first modulated light beam (e.g., a 90 degree rotation) to rotate the TE polarization of the first modulated light beam to a TM polarization, and combines the first modulated light beam with the second modulated light beam, received via the first light path 530, to form a modulated optical signal. The modulated optical signal is then forwarded from the WDM PIRM 500 via the same communication medium over which the WDM PIRM 500 received the CW light. By employing the optical circuit of WDM PIRM 500, the dependence of polarization on an incoming CW light having a plurality of wavelengths for modulation is eliminated. Absorbers 550 are coupled to the first light path 530 and the second light path 540 and configured to absorb residual light (e.g., light from the first or second light beams or modulated light beams on the first light path 530 and/or the second light path 540) that is not filtered or dropped from the first light beam or the second light beam by the ring resonators 520.

Figure 6:
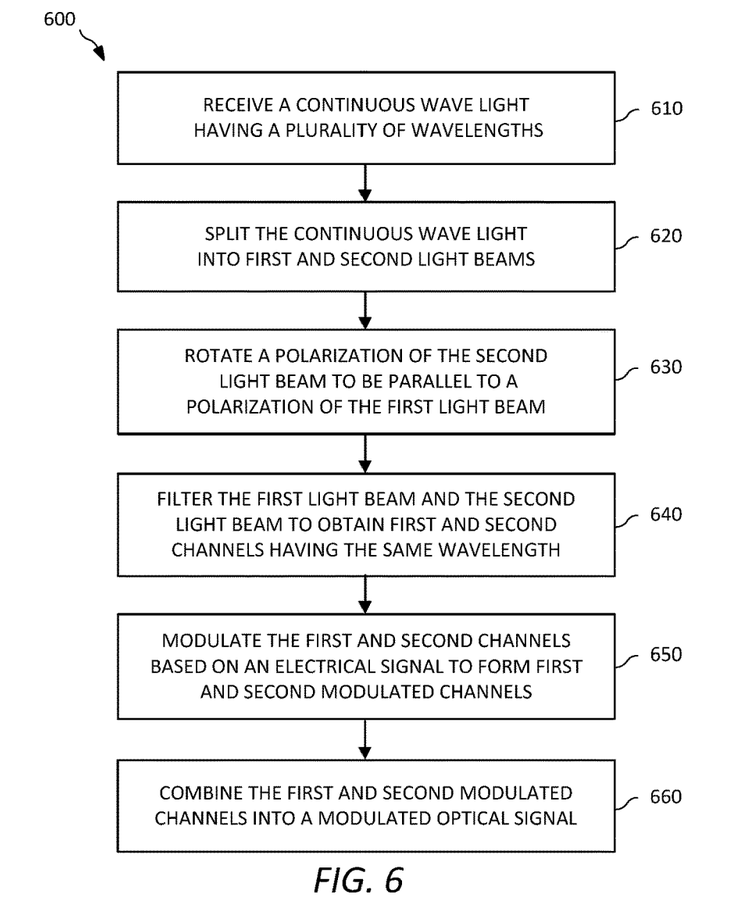
FIG. 6 is a flowchart of an embodiment of a method of WDM PIRM based modulation.

FIG. 6 is a flowchart of an embodiment of a method 600 for WDM PIRM based modulation. The method 600 is implemented, for example, by a WDM PIRM such as WDM PIRMs 200, 300, 400, and/or 500 in a network such as datacenter network 100, to modulate optical carriers (e.g., wavelengths of a CW light) with electrical data. In some embodiments, the method 600 is implemented when a WDM PIRM receives a CW light for modulation prior to transmission as modulated downlink signals to a downstream device. At step 610, a CW light having a plurality of wavelengths is received by a WDM PIRM. The CW light is received, in some embodiments, from a light source such as a DWDM CW laser, directly or indirectly (e.g., via a component located between the WDM PIRM and the light source). At step 620, the CW light is split (e.g., by a PBS) into first and second light beams, where a polarization of the first light beam is orthogonal (e.g., perpendicular) to a polarization of the second light beam. At step 630, the polarization of the second light beam is rotated (e.g., by a PR) to be parallel to the polarization of the first light beam. Optionally, in some embodiments steps 620 and 630 are performed by a single optical component configured to perform the functions of both an optical splitter and a polarization rotator (e.g., a PSR) such that steps 620 and 630 may be performed as a single step or operation. At step 640, the first light beam and the second light beam are filtered to produce corresponding first and second channels having a same wavelength of the plurality of wavelengths of the CW light. For example, the first and second light beams may be filtered via de-multiplexing the first and second light beams, dropping wavelengths from the first and second light beams via ring resonators, or any other suitable means for selectively removing a particular wavelength from a light beam for processing. At step 650, the first and second channels are modulated based on an electrical signal or electrical data to form first and second modulated channels. The modulation is performed, for example, by any suitable modulation technique and may be performed substantially simultaneously on the first channel and the second channel. As discussed above, the first channel and the second channel traverse the modulator in opposite directions such that processing of the CW light by the WDM PIRM is performed in a clockwise loop and a counter clockwise loop. At step 660, the first modulated channel and the second modulated channel are combined (e.g., by an optical combiner such as a PBS or a PSR) into a modulated optical signal for transmission by the WDM PIRM. The first modulated channel and the second modulated channel may be combined, for example, after the first modulated channel and the second modulated channel are added (e.g., by a multiplexer and/or ring resonator) to light beams that include other modulated channels. One of the first modulated channel or the second modulated channel may be rotated (e.g., to be orthogonal with respect to the other of the first modulated channel and the second modulated channel) prior to being combined.

In some embodiments, the present disclosure includes an apparatus comprising a polarization beam splitting means optically coupled to a first light path and a second light path and configured to receive a CW light having a plurality of wavelengths, forward a first light beam of the CW light along the first light path, and forward a second light beam of the CW light along the second light path, wherein the first light beam comprises a first polarization that is perpendicular to a second polarization of the second light beam upon exiting the polarization beam splitter. The apparatus also includes a first multiplexing means coupled to the first light path and configured to de-multiplex the first light beam into a first plurality of channels, each corresponding to one of the plurality of wavelengths. The apparatus also includes a second multiplexing means coupled to the second light path and configured to de-multiplex the second light beam into a second plurality of channels, each corresponding to one of the plurality of wavelengths. The apparatus also includes a first optical modulating means coupled to the first multiplexing means and the second multiplexing means and configured to modulate, by an electrical signal, a first channel of the first plurality of channels and a second channel of the second plurality of channels, wherein a wavelength of the first channel of the first plurality of channels and the second channel of the second plurality of channels is the same.

In some embodiments, the disclosure includes an apparatus comprising an optical circulating means configured to receive and forward optical communications and a polarization independent reflective modulating means coupled to the optical circulator and configured to receive a CW light comprising a plurality of optical wavelengths from the optical circulating means, split the CW light into a first light beam and a second light beam, filter the first light beam to obtain a first channel having a first wavelength, filter the second light beam to obtain a second channel having the first wavelength, modulate an electrical signal onto the first channel to form a first modulated channel and the second channel to form a second modulated channel, combine the first modulated channel and the second modulated channel to create a modulated signal, and forward the modulated optical signal to a downstream device via the optical circulating means.

A means for optical modulating comprising receiving a CW light having multiple wavelengths, splitting the CW light into a first light beam and a second light beam, filtering the first light beam and the second light beam to obtain a first channel and a second channel, wherein the first channel and the second channel include a same wavelength of the multiple wavelengths, modulating an electrical signal onto the first channel and the second channel to form first and second modulated channels, and combining the first modulated channel and the second modulated channel to create a modulated optical signal.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a polarization beam splitter optically coupled to a first light path and a second light path and configured to:
        receive a continuous wave (CW) light having a plurality of wavelengths;
        forward a first light beam of the CW light along the first light path; and
        forward a second light beam of the CW light along the second light path, wherein a first polarization of the first light beam is perpendicular to a second polarization of the second light beam when exiting the polarization beam splitter;
    a first multiplexer coupled to the first light path and configured to de-multiplex the first light beam into a first plurality of optical carriers, each of the first plurality of optical carriers corresponding to one of the plurality of wavelengths;
    a second multiplexer coupled to the second light path and configured to de-multiplex the second light beam into a second plurality of optical carriers, each of the second plurality of optical carriers corresponding to one of the plurality of wavelengths; and
    a first optical modulator coupled to the first multiplexer and the second multiplexer and configured to modulate a first optical carrier of the first plurality of optical carriers with an electrical signal, and modulate a second optical carrier of the second plurality of optical carriers with the electrical signal, wherein a wavelength of the first optical carrier of the first plurality of optical carriers equals a wavelength of the second optical carrier of the second plurality of optical carriers.

2. The apparatus of claim 1, wherein modulating the first optical carrier and the second optical carrier comprises:
    receiving the first optical carrier of the first plurality of optical carriers via a first side of the first optical modulator from the first multiplexer;
    receiving the second optical carrier of the second plurality of optical carriers via a second side of the first optical modulator from the second multiplexer;
    modulating the first optical carrier to generate a first modulated optical signal;
    modulating the second optical carrier to generate a second modulated optical signal;
    outputting the first modulated optical signal to the second multiplexer via the second side of the first optical modulator; and
    outputting the second modulated optical signal to the first multiplexer via the first side of the first optical modulator.

3. The apparatus of claim 2, further comprising a second optical modulator coupled to the first multiplexer and the second multiplexer and configured to:
    receive a third optical carrier of the first plurality of optical carriers via a first side of the second optical modulator from the first multiplexer;
    receive a fourth optical carrier of the second plurality of optical carriers via a second side of the second optical modulator from the second multiplexer;
    modulate the third optical carrier to generate a third modulated optical signal;
    modulate the fourth optical carrier to generate a fourth modulated optical signal;
    output the third modulated optical signal to the second multiplexer via the second side of the second optical modulator; and
    output the fourth modulated optical signal to the first multiplexer via the first side of the second optical modulator.

4. The apparatus of claim 3, wherein the first multiplexer is further configured to multiplex the second modulated optical signal and the fourth modulated optical signal to form a second modulated light beam, and wherein the second multiplexer is further configured to multiplex the first modulated optical signal and the third modulated optical signal to form a first modulated light beam.

5. The apparatus of claim 4, wherein the polarization beam splitter is further configured to:
   combine the first modulated light beam and the second modulated light beam into a modulated optical signal; and
   forward the modulated optical signal in an opposite direction to a direction in which the CW light was received.

6. The apparatus of claim 1, further comprising a polarization rotator positioned along the first light path and configured to rotate the first polarization of the first light beam to be parallel to the second polarization of the second light beam.

7. The apparatus of claim 6, wherein the polarization beam splitter and the polarization rotator are comprised in a polarization splitter rotator (PSR).

8. The apparatus of claim 1, wherein the polarization beam splitter, the first multiplexer, the second multiplexer, and the first optical modulator are comprised in a wavelength division multiplexed (WMD) polarization independent reflective modulator (PIRM), and wherein the apparatus further comprises an optical circulator coupled to the WDM PIRM, a downlink communication medium coupled to the optical circulator, and a splitter coupled to the optical circulator.

9. The apparatus of claim 8, wherein the WDM PIRM receives the CW light from the splitter via the optical circulator and forwards a modulated optical signal to the downlink communication medium via the optical circulator.

10. The apparatus of claim 1, wherein the polarization beam splitter is coupled to the first multiplexer via a first optical waveguide, and wherein the polarization beam splitter is coupled to the second multiplexer via a second optical waveguide.

11. An apparatus comprising:
   an optical circulator configured to receive and forward optical communications; and
   a wavelength division multiplexed (WDM) polarization independent reflective modulator (PIRM) coupled to the optical circulator and configured to:
      receive a continuous wave (CW) light comprising a plurality of optical wavelengths from the optical circulator;
      split the CW light into a first light beam and a second light beam;
      filter the first light beam to obtain a first optical carrier having a first wavelength;
      filter the second light beam to obtain a second optical carrier having the first wavelength;
      modulate an electrical signal onto the first optical carrier to form a first modulated optical signal and the second optical carrier to form a second modulated optical signal;
      combine the first modulated optical signal and the second modulated optical signal to create a combined modulated optical signal; and
      forward the combined modulated optical signal to a downstream device via the optical circulator.

12. The apparatus of claim 11, wherein a second polarization of the second light beam is orthogonal to a first polarization of the first light beam, and wherein the WDM PIRM is further configured to rotate the second polarization to be parallel to the first polarization and modulate both the first optical carrier and the second optical carrier substantially simultaneously.

13. The apparatus of claim 11, wherein the WDM PIRM comprises:
   a first multiplexer configured to de-multiplex the first light beam to obtain the first optical carrier; and
   a second multiplexer configured to de-multiplex the second light beam to obtain the second optical carrier.

14. The apparatus of claim 13, wherein the WDM PIRM further comprises an optical modulator configured to modulate the electrical signal onto the first optical carrier to form the first modulated optical signal and the second optical carrier to form the second modulated optical signal substantially simultaneously.

15. The apparatus of claim 11, wherein the WDM PIRM comprises:
   a first ring resonator configured to filter the first light beam to obtain the first optical carrier; and
   a second ring resonator configured to filter the second light beam to obtain the second optical carrier.

16. The apparatus of claim 15, wherein the WDM PIRM further comprises a thermal mechanism configured to heat at least one of the first ring resonator or the second ring resonator to determine the first wavelength.

17. The apparatus of claim 11, wherein the WDM PIRM comprises a ring resonator configured to:
   filter the first light beam to obtain the first optical carrier having the first wavelength;
   filter the second light beam to obtain the second optical carrier having the first wavelength; and
   modulate the electrical signal onto the first optical carrier to form the first modulated optical signal and the second optical carrier to form the second modulated optical signal substantially simultaneously.

18. A method comprising:
   receiving a continuous wave (CW) light having multiple wavelengths;
   splitting the CW light into a first light beam and a second light beam;
   filtering the first light beam and the second light beam to obtain a first optical carrier and a second optical carrier, wherein the first optical carrier and the second optical carrier include a same wavelength of the multiple wavelengths of the CW light;
   modulating an electrical signal onto the first optical carrier and the second optical carrier to form first and second modulated optical signals; and
   combining the first modulated optical signal and the second modulated optical signal to create a combined modulated optical signal.

19. The method of claim 18, wherein each of the multiple wavelengths of the CW light is filtered from the first light beam and the second light beam and individually modulated substantially simultaneously.

20. The method of claim 19, further comprising rotating a second polarization of the second light beam to be parallel to a first polarization of the first light beam prior to filtering.

21. The apparatus of claim 1, further comprising:
   a plurality of N optical modulators, including the first optical modulator, coupled to the first multiplexer and the second multiplexer, wherein N is equal to a number of wavelengths in the plurality of wavelengths of the CW light, wherein each of the plurality of N optical modulators is configured to receive a unique wavelength of the first plurality of optical carriers from the first multiplexer and also receive the unique wavelength corresponding to the second plurality of optical carriers from the second multiplexer.

* * * * *

UNITED STATES PATENT AND TRADEMARK OFFICE
CERTIFICATE OF CORRECTION

PATENT NO. : 10,551,640 B2
APPLICATION NO. : 15/357199
DATED : February 4, 2020
INVENTOR(S) : Yangjing Wen et al.

Page 1 of 1

It is certified that error appears in the above-identified patent and that said Letters Patent is hereby corrected as shown below:

On the Title Page

Page 2, Second Column, item (56) Other Publications, Lines 5-7, should read:
Chen et al., Full-duplex bidirectional data transmission link using twisted lights multiplexing over 1.1-km orbital angular momentum fiber, Scientific Reports | 6:38181 | DOI: 10.1038/srep38181.*

Signed and Sealed this
Twenty-fourth Day of March, 2020

Andrei Iancu
*Director of the United States Patent and Trademark Office*